(No Model.)
H. W. ROOP.
EXCAVATOR.
No. 361,895. Patented Apr. 26, 1887.
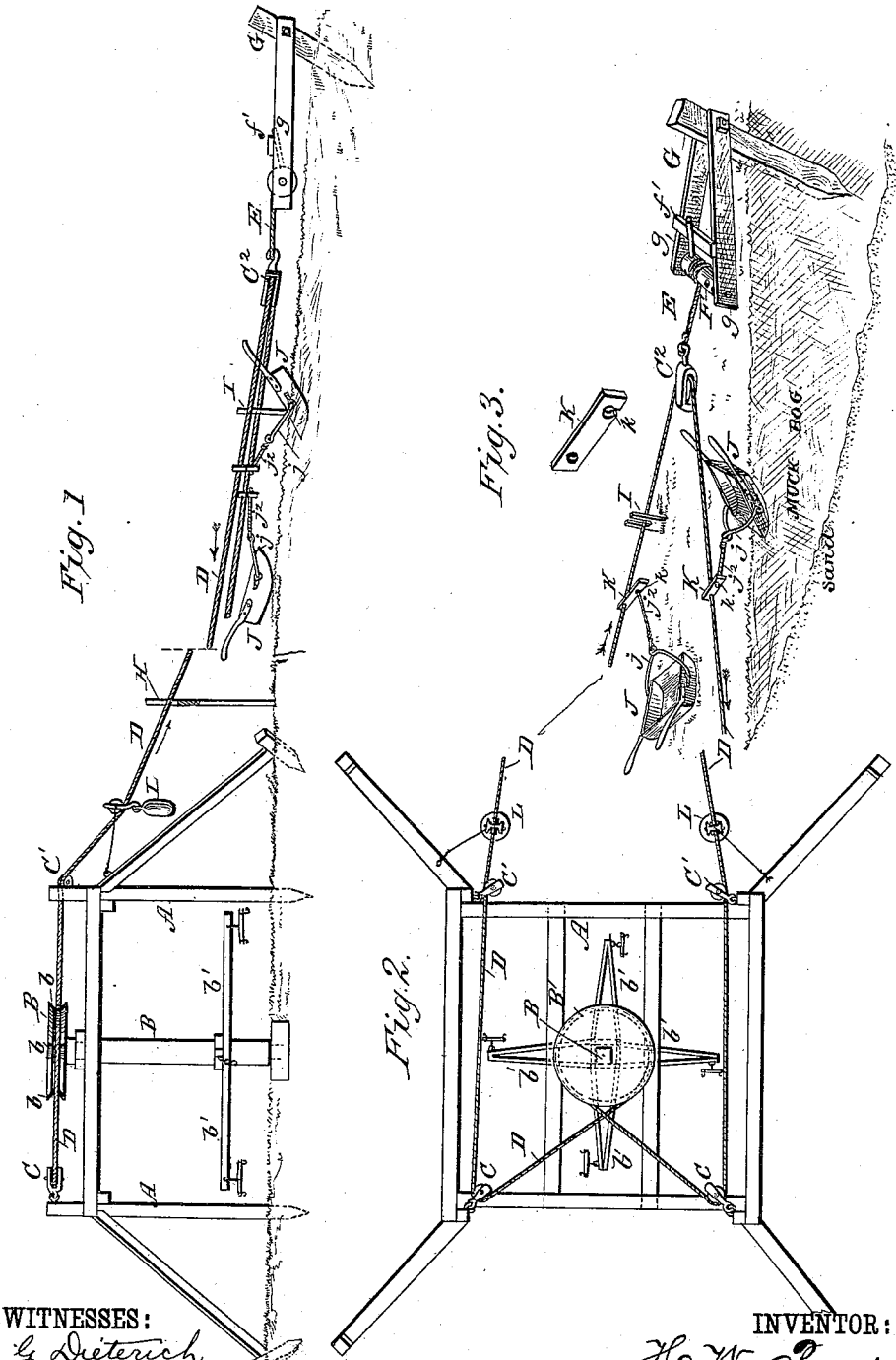
WITNESSES:
Fred G. Dieterich
Solon C. Kemon
INVENTOR:
H. W. Roop
BY Munn & Co.
ATTORNEYS.

UNITED STATES PATENT OFFICE.

HOWARD WILSON ROOP, OF McMEEKIN, FLORIDA.

EXCAVATOR.

SPECIFICATION forming part of Letters Patent No. 361,895, dated April 26, 1887.

Application filed December 14, 1886. Serial No. 221,522. (No model.)

*To all whom it may concern:*

Be it known that I, HOWARD WILSON ROOP, of McMeekin, in the county of Putnam and State of Florida, have invented certain Improvements in Excavators, of which the following is a full, clear, and concise specification, reference being had to the accompanying drawings, in which—

Figure 1 is a side elevation of my improved apparatus in position for use as a bog-excavator. Fig. 2 is a detail plan view of the same, and Fig. 3 is a detail perspective view of the same.

The invention will be first described, and then specifically set forth in the claims.

A represents the frame-work, which is to be secured on the shore adjacent to the bog. Within the frame is journaled a vertical shaft, B, carrying a horizontal grooved wheel, B', formed to suit the cable used, whether the same be in the form of a rope, chain, or belt. This wheel B', when a rope cable is used, is provided in its groove with rubber blocks $b$; or, if desired, the grooved surface may be covered with rubber, or a rubber ring may be secured therein, so that the rope will be prevented from slipping.

The shaft B may be driven by any suitable power; but it is shown provided with levers $b'$, the outer ends of which are provided with eyebolts or clevises to which single-trees are connected, so that horses may be harnessed thereto for operating said shaft. To the upper rear corners of the frame pulleys C are secured, and to the opposite or forward corners are secured pulleys C' C'. An endless cable, D, is passed around the wheel B, and is crossed at the rear edge thereof, and passes thence through the pulleys C C, and then forwardly through the pulleys C' C' to and through a pulley, $C^2$, which is secured to a cable, E, wound on a windlass, F, journaled in arms $g$ of the anchor G, driven into the bog, as clearly shown in the drawings. The incoming cable passes through a slot or aperture in an upright, H, driven into the ground on the shore beyond where the scoops, to be presently described, are to be dumped, and a similar upright, I, is provided for the outgoing portion of the cable at a point adjacent to where the excavating is to be done, for a purpose to be presently described.

J represents the excavators, which are provided with handles secured at the rear ends of the bowls, and with forwardly-extending yokes or loops $j$, pivotally connected to the sides of the bowls. These yokes $j$ are detachably connected to the cable by means of any suitable gripping device; but I prefer the friction-grips K shown, the same consisting in a piece of wood or other material having a hole in its rear end for the attaching rope or chain $j^2$, and with a slot, $k$, at the forward end of its lower edge, as clearly shown.

The operation is as follows: The frame A is first set up on the shore at a suitable distance from the bog. The anchor G is then driven down into the bog and the endless cable is properly passed around wheel B and pulleys C C C' C' $C^2$. The windlass F is then turned to draw the cable taut, and is then locked by means of its operating-lever and a cross-piece, $f'$, or by any suitable pawl-and-ratchet mechanism, as will be readily understood. An operator secures an excavator to the incoming portion of the cable by passing the cable into the notch $k$ of the grip K, the strain causing the edges of the slot to bind firmly on the cable to prevent slipping. The excavator is drawn along until the proper place on shore is reached, when it is dumped by an operator stationed there, the slotted spring H preventing the excavator from being drawn against the frame or driving-wheel. This latter operator then detaches the grip and attaches it to the outgoing part of the cable, so that the excavator is carried out into the bog to be detached and secured to the incoming part of the cable by the operator stationed there, the slotted upright I preventing the excavator from going too far by engaging the grip, as will be readily understood. Thus the excavating will be continuous.

The frame A is further provided with weights L, connected thereto by short cords or chains, and having pulley-blocks, through which the cable passes from the pulleys C' to take up slack and yet allow some play to the cable.

Having thus described my invention, what I claim as new, and desire to secure by Letters Patent, is—

1. An excavating apparatus comprising the shore pulley, its driving mechanism, the bog-anchor and its pulley, the endless cable passing around said pulleys, and a detachable excavator-bowl adapted to be carried to shore by the ingoing side of the cable and returned to the bog by the outgoing side, substantially as set forth.

2. The combination, with the frame, of the shaft journaled therein, the wheel on the shaft, and means for operating the shaft, of the anchor and its pulley, the endless cable, the excavator having a detachable grip, and the slotted upright for stopping the excavator when the grip contacts therewith, substantially as set forth.

3. The combination, with the shore frame, the shaft journaled therein, the wheel thereon, and means for operating the shaft, of the bog-anchor, a windlass journaled thereon, a cable passed around said windlass and having a pulley at its forward end, the endless operating-cable extending from the main wheel around the said pulley, and the detachable excavator for the said endless cable, substantially as set forth.

4. The combination, with the frame, the vertical shaft journaled therein and having the horizontal wheel and a driving mechanism, and the pulleys at the upper forward and rear corners of the frame, of the anchor provided with a pulley, the endless cable engaging said wheel and pulleys, and the slotted uprights through which the incoming and outgoing parts of the cable pass adjacent to the points of dumping and excavation, substantially as set forth.

HOWARD WILSON ROOP.

Witnesses:
THOS. ROUNTREE,
C. F. MORSE.